July 15, 1941.      J. W. DUDLEY      2,249,286
HYDRAULIC BRAKE SYSTEM
Filed March 4, 1941
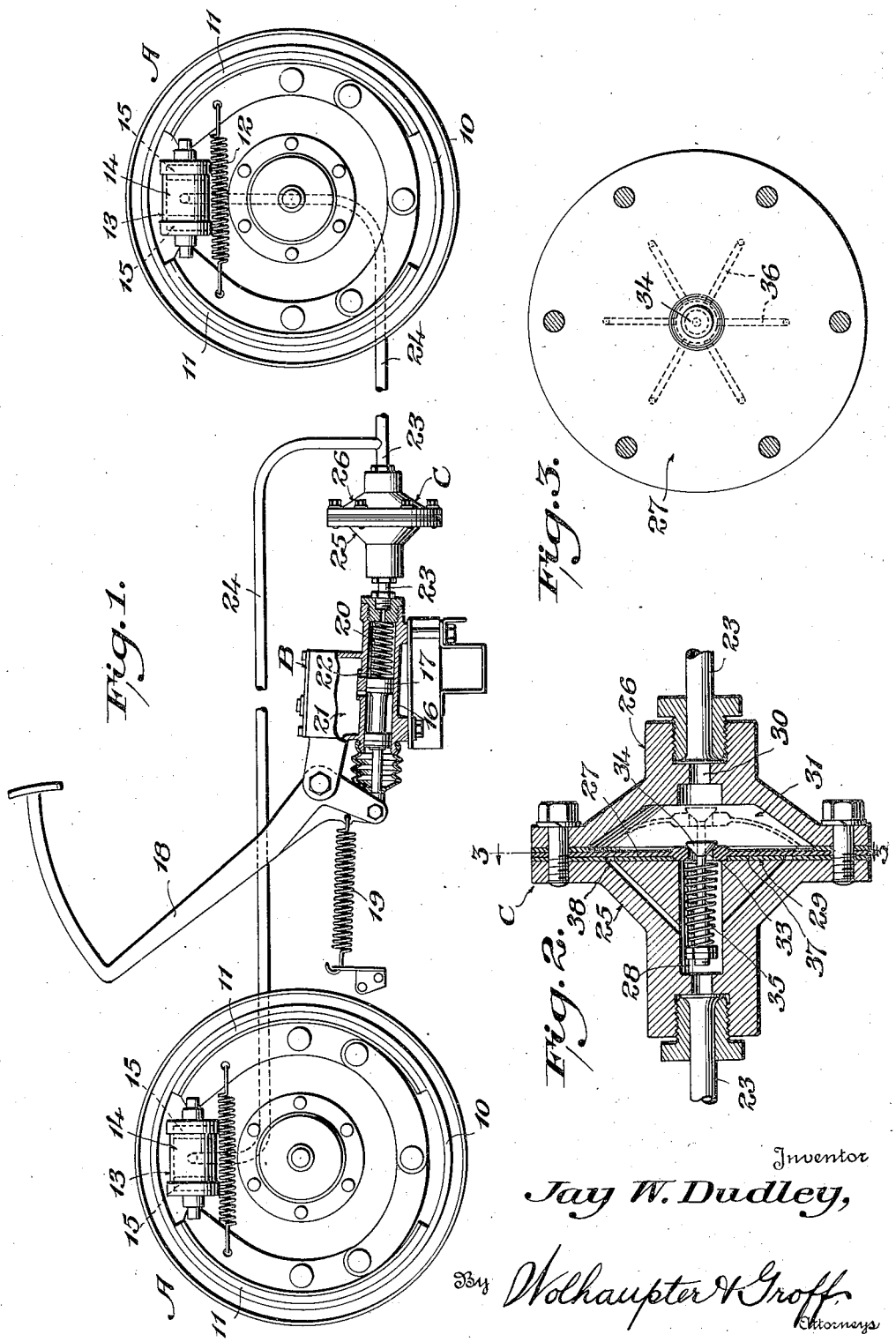
Inventor
Jay W. Dudley,
By Wolhaupter & Groff
Attorneys Patented July 15, 1941

2,249,286

UNITED STATES PATENT OFFICE 2,249,286

HYDRAULIC BRAKE SYSTEM

Jay W. Dudley, Knoxville, Tenn.

Application March 4, 1941, Serial No. 381,732

5 Claims. (Cl. 188—152)

This invention relates to hydraulic brake systems, particularly for automotive vehicles, although not limited thereto, and has particular reference to improvements in hydraulic brake systems of the general type in which a master unit is employed to exert force on the liquid in the system to effect brake-applying actuation of the hydraulically operable brake-applying units of the system.

In hydraulic brake systems of the general type referred to the master unit usually includes a liquid reservoir from which liquid is supplied to the system to maintain the latter filled and into which liquid flows from the system when the brakes are released.

Since, in most brake systems of the type referred to liquid flows into the liquid reservoir when the brakes are released, it follows that as the brakes wear and are required to be moved farther from their released positions to their applied positions, progressively increasing amounts of movement of the foot pedal or equivalent element usually employed for actuating the master unit are required to effect application of the brakes. The range of movement of the foot pedal or equivalent element is, however, usually limited and thus it follows that after a certain amount of wear of the brakes has occurred the foot pedal or equivalent element no longer is effective to impart sufficient movement to the master piston to effectively apply the brakes. When this condition is reached or approached it becomes necessary to adjust the brakes to compensate for wear thereof.

Adjusting brakes periodically to compensate for wear is a nuisance and involves material expense. Accordingly, the object of the present invention, generally speaking is to provide, in a hydraulic brake system of the type mentioned, simple, inexpensive, practical, reliable and efficient means to eliminate any necessity of adjusting the brakes or any part of the system to compensate for wear of the brakes—in other words, to provide means whereby the amount of movement of the brake pedal or equivalent element required to apply the brakes remains the same regardless of wear of the brakes.

With the foregoing and other objects in view, which will become more fully apparent as the nature of the invention is better understood, the same consists in the novel combination and arrangement of parts and in the novel features of construction thereof, as will be hereinafter more fully described, illustrated in the accompanying drawing and defined in the appended claims.

In the accompanying drawing, wherein like characters of reference denote corresponding parts in the different views:

Figure 1 is a diagrammatic sectional view of a hydraulic brake system embodying the features of the invention.

Figure 2 is a central, longitudinal section through the unit interposed in the system to compensate for wear of the brakes; and Figure 3 is a cross section on the line 3—3 of Fig. 2.

Referring to the drawing in detail, A, A designate, generally, a pair of hydraulic brakes such, for example, as one of the front wheel brakes and one of the rear wheel brakes of an automotive vehicle, B designates, generally, a master unit hydraulically connected with the brakes A, A and including an element movable to exert force on liquid in the system to effect application of the brakes, and C designates, generally, a unit constructed in accordance with a practical embodiment of the invention and interposed in the system between the brakes A, A and the master unit B to render the master unit B effective by an unvarying amount of movement of the movable element thereof to apply the brakes regardless of wear on the same.

As far as the present invention is concerned the particular form of the brakes A, A is immaterial, other than that each of the same shall include a hydraulically operable unit to effect its application and suitable spring means to effect its release. In the present instance and by way of example the brakes A, A are illustrated as being of a well known type each comprising a drum 10 which is understood to be carried by a related vehicle wheel, shoes 11 for cooperation with said drum, spring means 12 for effecting release of said shoes, and a hydraulically operable unit 13 for spreading said shoes into braking engagement with said drum, the unit 13 comprising a cylinder 14 and a pair of pistons 15, 15 therein respectively associated with the shoes and adapted to be moved apart by liquid forced therebetween to spread the shoes.

As far as the present invention is concerned the particular form of the master unit B likewise is immaterial, other than that it shall include an element movable to force liquid to the units 13 and means for insuring a liquid-filled condition of the system at all times. In the present instance the unit B is illustrated as being of a known type comprising a cylinder 16, a piston 17 in said cylinder movable in one direction by a foot pedal 18 to exert brake-applying force on the liquid in the system, a pair of springs 19 and 20, one associated with the foot pedal 18 and the other with the piston 17 for retracting said foot pedal and piston upon release of force from the foot pedal, and a reservoir 21 having communication with the cylinder 16 by a port 22 located at a point to admit liquid to the system when the piston 17 is fully retracted to insure a liquid-filled condition of the system at all times. Leading from the delivery end of the cylinder 16 is a pipe 23 which is connected by branch pipes 24 with the hydraulically operable units 13 of the brakes A, said branch pipes being connected in the present instance with the cylinders 14 between the pistons 15, 15 therein.

The unit C is interposed in the pipe 23 preferably adjacent to the cylinder 16 and comprises a housing composed of mating sections 25 and 26 bolted or otherwise suitably fastened together and confining between their marginal portions the marginal portion of a flexible diaphragm 27 which divides the system into two parts, namely, that part between the master unit B and said diaphragm and that part between said diaphragm and the brakes A.

The section 25 is in the first mentioned part of the system and is provided with a central bore 28 with which is connected that portion of the pipe 23 which leads from the delivery end of the cylinder 16 so that said bore constitutes, in effect, a part of said pipe 23. Moreover, the section 25 includes a face 29 which is substantially coextensive with the central, flexible portion of the diaphragm 27 and which constitutes a stop or abutment limiting flexure of said diaphragm toward the first mentioned part of the system; i. e., toward the master unit B.

The section 26 is in the second mentioned part of the system and is provided with a central bore 30 with which is connected that portion of the pipe 23 which leads to the branch pipes 24. Moreover, the section 26 is provided with a chamber 31 with which the bore 30 communicates and into which the diaphragm 27 is flexible under the influence of liquid forced thereagainst in the first mentioned part of the system by pedal actuation of the piston 17 of the master unit B.

In the diaphragm 27 is a central opening 33 which affords communication between the two parts of the system and which is controlled by a suitable check valve 34 which is arranged to open toward the second mentioned part of the system and to close toward the first mentioned part thereof. Associated with the check valve 34 is a light spring 35 which tends constantly to close said valve and to maintain same normally closed.

Normally the foot pedal 18 is held in a raised or retracted position by the spring 19 and normally the piston 17 of the master unit B is held in a retracted position by the spring 20. The first part of the system therefore is devoid of pressure and offers no resistance to flexure of the diaphragm 27 against the face 29 of the housing section 25. Accordingly, the springs 12 are free to act to contract the brake shoes 11 and to hold said shoes normally in brake-released positions. With contraction of the brake shoes the pistons 15, 15 of the units 13 are moved toward one another and force liquid in the second part of the system into the chamber 31, thereby causing the diaphragm 27 to be flexed against the stop face 29, since liquid in the second part of the system is prevented by the check valve 34 from entering the first part of the system. Thus, normally, the brakes are maintained released and the diaphragm 27 is maintained against the face 29, and it is understood that under these conditions the second part of the system is filled with liquid.

Assuming a normal condition of the system as recounted, initial depression of the foot pedal 18 will result in initial movement of the piston 17 to cover the port 22 and thereby communication between the reservoir 21 and the end portion of the cylinder 16 in advance of the piston 17 will be denied. Liquid thus will be trapped in the first part of the system to the exclusion of the reservoir 21 and as a consequence continued depression of the foot pedal 18 with continued advance of the piston 17 will result in the liquid in the first part of the system being displaced toward the diaphragm 27. The area of the diaphragm 27 exposed by the bore 28 is greater than the area of the central opening 33 in said diaphragm. Moreover, since the second part of the system is filled with liquid when the brakes are released and the diaphragm 27 is in its normal position against the face 29, displacement of liquid by the piston 17 toward said diaphragm will not result in opening of the valve 34 but will result in flexure of said diaphragm into the chamber 31. This, in turn, will result in displacement of the liquid in the second part of the system toward the units 13 with the result that the pistons 15, 15 of said units will be forced apart and the brakes will be applied.

Upon release of the foot pedal 18, same will be retracted by the spring 19, the piston 17 will be retracted by the spring 20, and the brakes will be released by the springs 12, thereby flexing the diaphragm 27 to its normal position against the face 29.

With wear of the brakes, increased movement of the pistons 15, 15 will be required to apply the brakes and the liquid capacity of the second part of the system thereby will be increased. When such a condition develops and the permissible amount of flexure of the diaphragm 27 does not result in building up a pressure in the second part of the system equal to the pressure developed in the first part of the system the valve 34 will open and admit liquid from the first part of the system to the second part of the system with the result that the units 13 will be subjected to the pressure developed by the piston 17. The brakes thus will be effectively applied and the liquid transferred from the first part of the system to the second part of the system will be trapped in the second part of the system and compensate for the wear of the brakes, the liquid transferred from the first part of the system to the second part thereof being replaced in the first part from the reservoir 21 when the piston 17 returns to its normal position. Thus it will be apparent that the unit C provides for application of the brakes by a practically unvarying amount of movement of the foot pedal 18 regardless of wear of the brakes, and that any necessity of adjustment of the brakes to compensate for wear is eliminated.

In order to insure against trapping of liquid in the space between the diaphragm 27 and the face 29 when said diaphragm is returned to its normal position after having been flexed to apply the brakes, thereby to insure complete and rapid release of the brakes, the section 25 is provided with liquid drain ducts 36 which open through the face 29 near the outer portion of the flexible part of said diaphragm and extend from said face 29 to the bore 28. In this connection, in order to prevent cutting of the diaphragm 27 by the edges of the ducts where they open through the face 29, said face preferably is covered by a sheet 37 of suitable soft material, said sheet having therein openings 38 alined with the ducts 36.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a hydraulic brake system, a brake, a hydraulically operable unit for applying said brake, spring means for releasing said brake, a master unit having a closed-circuit liquid connection with said brake-applying unit and including an element movable to exert force on liquid in the system to effect brake applying actuation of said brake-applying unit, a diaphragm in said connection dividing the system into two parts and arranged to be flexed by liquid forced by said master unit and by its flexure to force liquid to the brake-applying unit to actuate the latter to apply the brake, means to insure at all times a liquid-filled condition of that part of the system between said diaphragm and said master unit, said diaphragm having an opening therein for flow of liquid therethrough, a check valve controlling said opening, said check valve being arranged to open toward said brake-applying unit and to close toward said master unit whereby liquid may flow from that part of the system between said master unit and said diaphragm to that part of the system between said diaphragm and said brake-applying unit and is prevented from returning from said second mentioned part of the system to said first mentioned part of the system, thus to render the master unit effective by an unvarying amount of movement of the movable element thereof to effect application of the brake despite wear of the brake.

2. A hydraulic brake system as set forth in claim 1 including a wall to limit flexure of the diaphragm toward the master unit, said wall being substantially coextensive with the flexible portion of said diaphragm and having liquid drain openings therein leading from portions of the face of said wall engaged by marginal portions of the diaphragm to the first mentioned part of the system to insure complete and rapid drainage of liquid from between said diaphragm and the said face of said wall when the diaphragm moves toward said face of said wall upon release of the brakes.

3. In a hydraulic brake system, a brake, a hydraulically operable unit for applying said brake, spring means for releasing said brake, a master unit having a closed-circuit liquid connection with said brake-applying unit and including a cylinder and a piston movable therein to exert force on liquid in the system to effect brake-applying actuation of said brake-applying unit, a diaphragm in said connection dividing the system into two parts and arranged to be flexed by liquid forced by said piston and by its flexure to force liquid to the brake-applying unit to actuate the latter to apply the brake, said master unit including a liquid reservoir and means to insure at all times a supply of liquid from the same to that part of the system between said piston and said diaphragm to maintain said part of the system filled with liquid, said diaphragm having an opening therein for flow of liquid therethrough, a check valve controlling said opening, said check valve being arranged to open toward said brake-applying unit and to close toward said master unit whereby liquid may flow from that part of the system between said master unit and said diaphragm to that part of the system between said diaphragm and said brake-applying unit and is prevented from returning from said second mentioned part of the system to said first mentioned part of the system, thus to render the master unit effective by an unvarying amount of movement of the movable element thereof to effect application of the brake despite wear of the brake.

4. A hydraulic brake system as set forth in claim 1 including a pair of housing members between which the diaphragm is marginally clamped, one of said members having a chamber into which said diaphragm is flexible, the other of said members having a wall substantially coextensive with the flexible portion of said diaphragm and serving to limit flexure of said diaphragm toward the master unit.

5. A hydraulic brake system as set forth in claim 1 including a wall to limit flexure of the diaphragm toward the master unit, said wall being substantially coextensive with the flexible portion of said diaphragm and having liquid drain openings therein leading from portions of the face of said wall engaged by marginal portions of the diaphragm to the first mentioned part of the system to insure complete and rapid drainage of liquid from between said diaphragm and the said face of said wall when the diaphragm moves toward said face of said wall upon release of the brakes, and a pad disposed against said face of said wall to prevent cutting of the diaphragm by the edges of said openings.

JAY W. DUDLEY.